United States Patent
Everman

[11] Patent Number: 5,435,651
[45] Date of Patent: Jul. 25, 1995

[54] BACKLASH FREE ROTATIONALLY ADJUSTABLE MOUNT IN THE NATURE OF A TRANSMISSION

[76] Inventor: Michael R. Everman, 1126 Garden St., Santa Barbara, Calif. 93101

[21] Appl. No.: 152,491

[22] Filed: Nov. 15, 1993

[51] Int. Cl.$^6$ ............................................. F16C 19/49
[52] U.S. Cl. ................................. 384/452; 384/499; 384/583
[58] Field of Search ............ 384/452, 499, 506, 513, 384/519, 583, 571

[56] References Cited

U.S. PATENT DOCUMENTS

| | | |
|---|---|---|
| 2,471,015 | 5/1949 | Watten ................................. 384/452 |
| 4,222,697 | 12/1983 | Gugel et al. ......................... 384/452 |
| 4,223,961 | 9/1980 | Martinez .............................. 384/452 |
| 4,512,729 | 4/1985 | Sakamoto et al. ................... 384/452 |

Primary Examiner—Lenard A. Footland
Attorney, Agent, or Firm—Donald D. Mon

[57] ABSTRACT

A mount according to this invention includes a base and a rotor rotatably mounted to the base. The mount has a central axis. The rotor has an axis of rotation which is coincident with the central axis. A base race is fixed to the base, and a rotor race is fixed to the rotor. A base track face is formed on the base race, and a rotor track face is formed on the rotor race, antipodally spaced from one another. A plurality of bearing balls are held between these track faces. The track faces are frustums of cones so as to make a point contact with the balls.

7 Claims, 3 Drawing Sheets

BACKLASH FREE ROTATIONALLY ADJUSTABLE MOUNT IN THE NATURE OF A TRANSMISSION

FIELD OF THE INVENTION

A rotationally adjustable mount which is free from backlash, and which enables both gross and fine rotational adjustments to be made to a rotor, and which is also adaptable to use as a power transmission.

BACKGROUND OF THE INVENTION

It is conventional practice to mount instruments, optical devices, or manufactured parts on a rotatable table, and to provide means adjustably to rotate them for inspection or alignment. The objective of these mounts is to enable the device to be rotated around an axis and placed in a selected rotary position.

Such mounts nearly universally involve backlash, which is slack in the system, such that there is a delay in reversal of the mount when the adjustment means is reversed. This is at least an annoyance. It is desirable that the adjustment means and the mount be very closely coupled so the operator can quickly and reliably return to a position which he may inadvertently have passed without having to take up system slack.

Also, it is desirable for the mount to be able to be grossly rotated quickly, and then to be finely adjusted.

This apparatus is also useful as a power transmission

It is an object of this invention to provide the above features and advantages.

BRIEF DESCRIPTION OF THE INVENTION

A mount according to this invention includes a base and a rotor rotatably mounted to the base. The mount has a central axis. The rotor has an axis of rotation which is coincident with the central axis. A base race is fixed to the base, and a rotor race is fixed to the rotor. A base track face is formed on the base race, and a rotor track face is formed on the rotor race, antipodally spaced from one another. A plurality of bearing balls are held between these track faces. The track faces are frustums of cones so as to make a point contact with the balls.

A drive ring surrounds the balls and traps them against the track faces. The drive ring forms two track faces antipodally spaced from one another. They are also frustums of cones, so as to make a point contact with the balls.

All of the track faces are surfaces of revolution centered on the same central axis. All of the track faces make a conical angle with a plane normal to the central axis. Each angle has a numerical value. The angles may be different in algebraic sign, which is unimportant to this invention. What is important is that each of the faces faces toward the balls, and between them they trap the balls so as to function as a ball bearing.

At least two of the faces make a numerically equal conical angle with the equator of the ball when it is contacted by all of the track faces. Of the other two, one is not equal to the other. The other angle may be equal to, or different from, the first two when the latitudes of contact are equal relative to the central axis. If they are equal, then the equator of the balls will coincide with a plane normal to the central axis. If the contact points are shifted around the ball, then the equator of the ball will also shift.

Rotation of the drive ring drives the balls around the central axis. By way of explanation, assume what is not the situation—that all four conical angles were equal. Then the drive ring would drive the balls around the tracks on the base and on the rotor, and there would be no relative rotation between the base and the rotor. This would merely be a conventional ball bearing, mounting the drive ring for free rotation around the base-rotor combination.

Instead, when the angle of one of the faces differs and at least two are identical, a very different situation arises. Then the two like faces assume a driving relationship on the balls, one or the other of the other two balls will rotate relative to its contact face at a different velocity. Then, assuming a sufficient frictional contact such that the ball at the contact point and the face at the tangent point move at the same velocity, then the element which underlies its face will move at a different rotational velocity around the central axis. As a result, the rotor will rotate relative to the base. The relative rate of rotation is dependent on the relative conical angles.

With this construction, proportional incremental movements can be made with much larger movements of the outer surface of the drive ring.

The track faces make a frictional contact with the balls which can be overcome by sufficient gross torque on the rotor. Accordingly, should a quick and large rotation be desired, one need only take hold of the rotor and turn it. There will be a skidding movement between the balls and some or all of the track faces, but because the balls and the faces are all hardened surfaces, this will do no harm. After the gross movement, the drive ring can be used to make a finer adjustment.

This action would not be possible with a geared arrangement. Also note that a gear arrangement involves backlash, which is entirely absent in this device.

The described rotation of the rotor occurs as the consequence of rotation of the drive ring. Accordingly, this mount functions as a transmission, being driven by the drive ring. While the principal use is expected to be as an adjustable mount and powered by the hand, it is possible to connect the drive ring to a power source, such as through gears, belts or chains to a drive shaft. Then a very high ratio transmission is provided.

Also, the drive ring may be internal rather than external, to enable the device to be placed in line with its power source.

The above and other features of this invention will be fully understood from the following detailed description and the accompanying drawings in which:

DETAILED DESCRIPTION OF THE INVENTION

Figure 1:
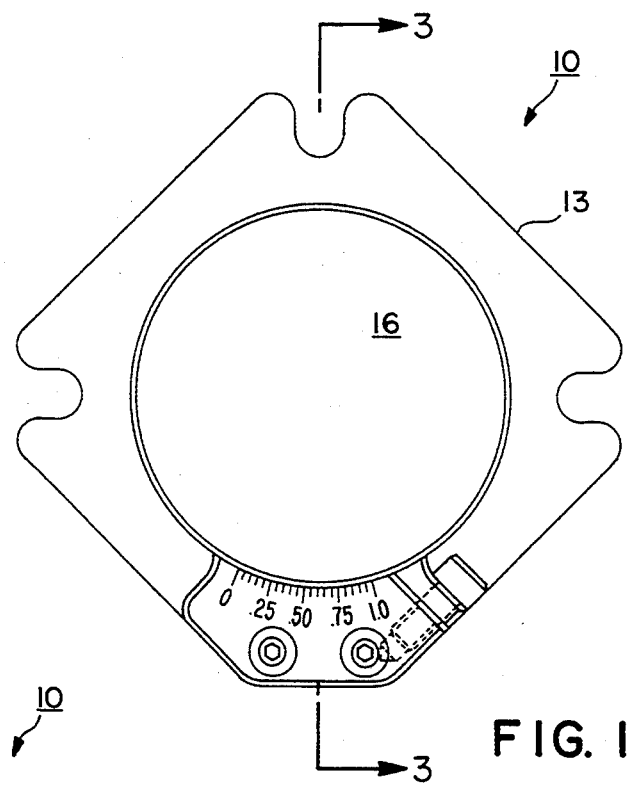
FIG. 1 is a top view of the invention.
Figure 3:
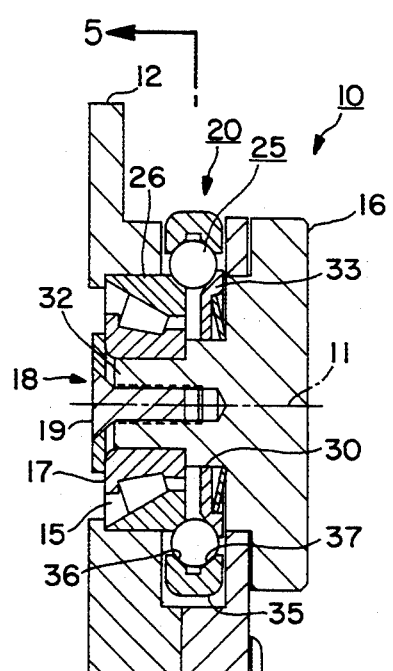
FIG. 3 is a cross section taken at line 3—3 in FIG. 1.
Figure 2:
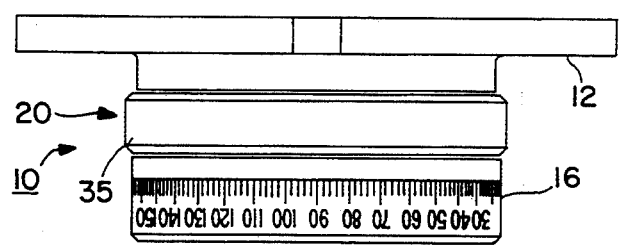
FIG. 2 is a left hand side view of FIG. 1.
Figure 4:
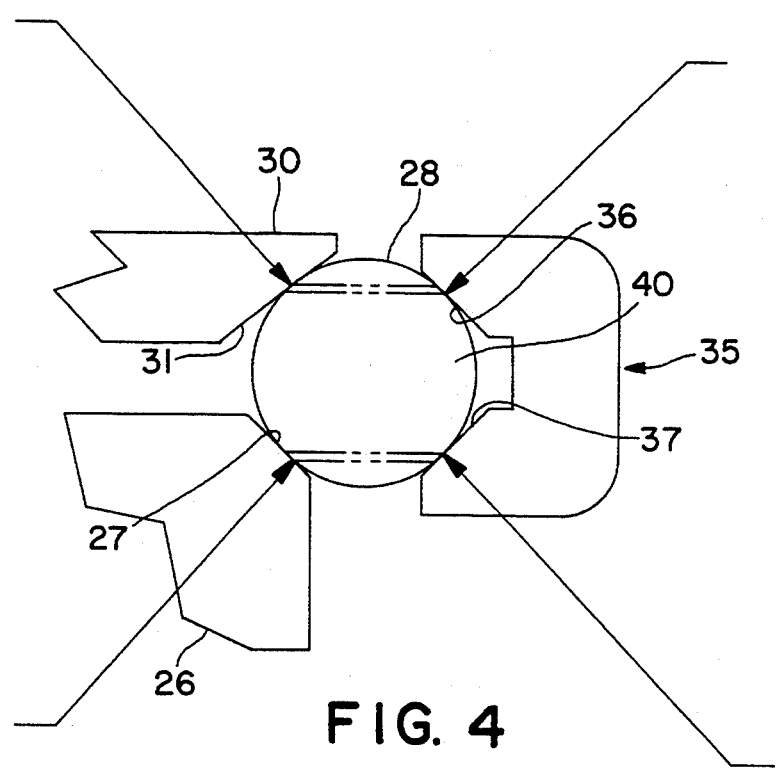
FIG. 4 is an enlarged vignette view of a portion of FIG. 3, showing the geometry of the invention.
Figure 5:
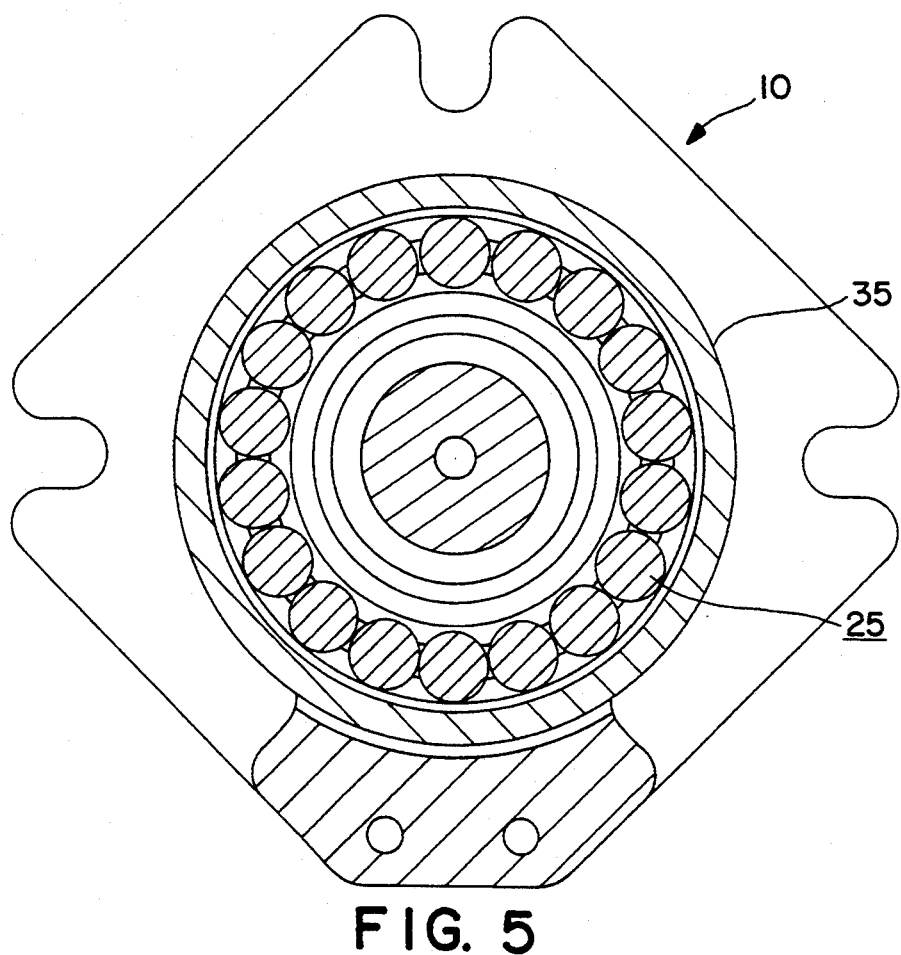
FIG. 5 is a cross-section taken at line 5—5 in FIG. 3.

A mount 10 according to the invention is shown in FIG. 1. It has a central axis 11 of rotation. A base 12 can be placed on any suitable support such as a table. A mounting flange 13 is provided for this purpose.

A tapered roller bearing 15 rotationally supports a rotor 16 to the base. It is held to the inner race 17 of the bearing by a retainer bolt 18 whose head 19 is above the level of the bottom of the base. A device (not shown) whose rotational position around the central axis is to be adjusted will be mounted by any suitable means to the top surface of the rotor. The rotor is freely rotatable around the axis, and as will later be shown, if sufficient torque is exerted, a gross adjustment can quickly be made by turning the rotor.

However, this does not accomplish the fine adjustment of position which it is the principal objective of this invention to provide when it is used as a mount. For this purpose a rotational adjustment means 20 is provided. The adjustment means includes a second bearing 25. This bearing necessarily is a ball bearing. The outer race 26 of the roller bearing is fixed to the base, and constitutes a fixed base race for the ball bearing, with a fixed base track face 27, which is the frustum of a cone. Balls 28 of bearing 25 will make point contact with track face 27.

A rotor race 30 is disposed above the base race. It has a rotor track face 31, which also is the frustum of a cone. Race 30 is slidably fitted on shaft 32 of the rotor, and is biased downwardly by resilient means 33 such as a Belleville washer or a wave spring. It bears between the rotor and the rotor race to bias track face 31 against the balls.

Optional splines or any other rotary couplings that is axially resilient may be provided, for example splines keyed into slots on shaft 32 if it is desired that the rotor race must rotate with the rotor. This is not a necessary element, but does have an advantage to be discussed below.

A drive ring 35 surrounds and completes bearing 25. It includes two drive track faces 36, 37, both frustums of cones, both contacting the balls, but on opposite sides of the equator of the balls.

A more detailed description of the relationships between the tracks will now be given. Assume that each of these four tracks made the same numerical angle with the equator 40 of the balls. Of course they differ in the algebraic sign of the angle (positive upwardly and negative downwardly). When they are equal, the drive ring would simply run around the balls, the balls would be rotated by the drive ring, and run around the inside faces along equal antipodal latitudes. Nothing would happen between the base and the rotor. This invention specifically excludes this useless embodiment.

In the actual embodiment, at least one of the conical angles is different from all of the others, and at least a pair should be equal. In the example shown, face 31 has a lesser numerical angle than face 27. Because all of the balls make a point contact with their respective race, their paths will be a circular line at the given latitude. The latitude of the contact of face 31 is numerically larger than that of face 27, so that its perimeter is also smaller. Reverse direction action is obtained when the angle is greater.

Now, with the conical angles at the drive track faces equal, and at least one of the paths at the other faces is different, something must yield. In this device it is the rotor race, which will rotate relative to the base race, taking the rotor with it. The drive ring can be made comparatively large, so that it is capable of making very small angular adjustments of the rotor.

The bias means can generally be relied on to keep the rotor from turning relative to the rotor race. However, if desired, the splines can be provided to assure it. Surprisingly this does not necessarily create a backlash because a sufficiently strong spring will generally keep them together, except in very strenuous operation, which usually does not occur, and they are closely fitted.

If a gross movement is desired, the rotor will be turned without turning the drive ring. Then the balls will simply drag along at least one of the tracks. However, the tracks and the balls are very hard, and this will not adversely affect them, especially if the bearing is lubricated.

Suitable angles for the track faces, given in absolute degrees are as follows:
Drive tracks 36 and 37, 45°
Base track face 27, 45°
Rotor track face 36, 39°. This provides approximately a 20:1 rotation between the rotor and the drive ring.

Further with regard to the relationship between the track faces, it should be observed that the equator of the balls can lie in a plane which is not normal to the central axis of the mount. The polar axis of the balls is determined by the relative angles between the two track faces which are on the same structure, in this case the drive ring. If these angles are numerically equal, then the polar axis is parallel to the central axis. However, if they are different, the polar axis around which the balls rotate will be tilted relative to the central axis. Then the equality of the angles refers only to the equator of the balls in motion. This arrangement functions identically with the illustrated example.

The embodiment of FIG. 1 can be used as a power transmission by coupling it to power means (not shown) with gears or belts, when in-line transmission is not required.

Figure 6:
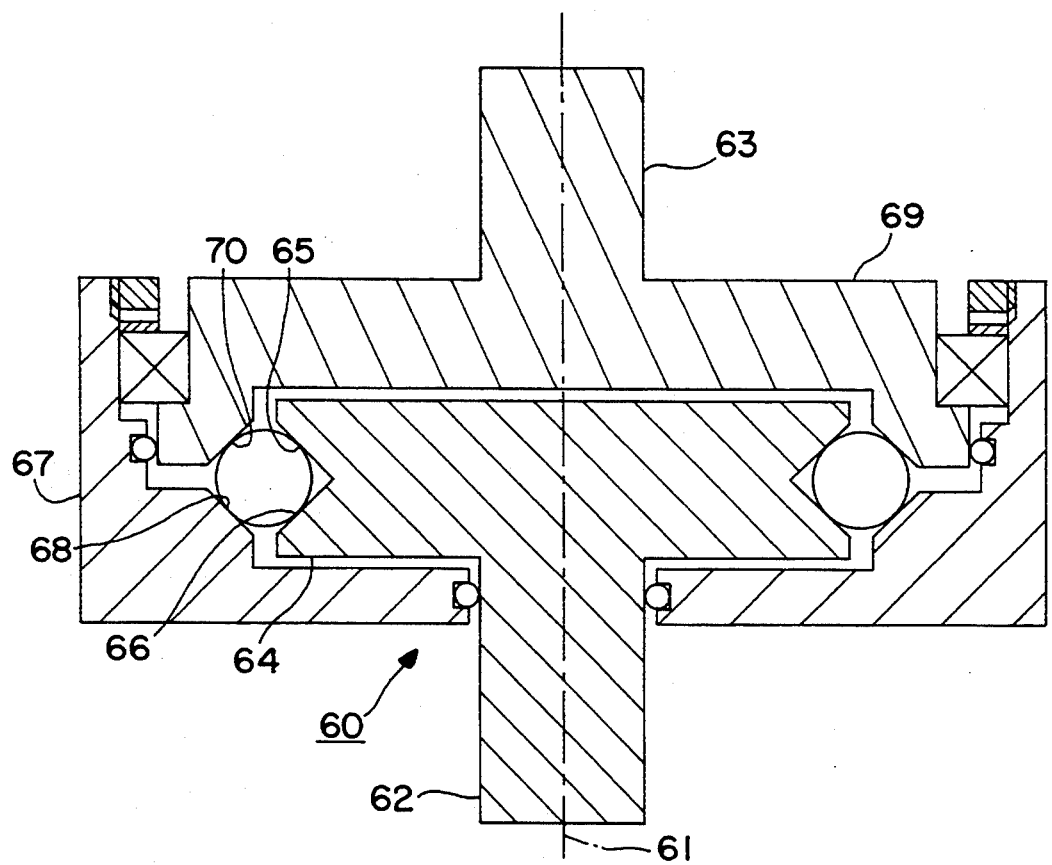
FIG. 6 is an axial cross-section of the apparatus adapted for power transmission.
Figure 7:
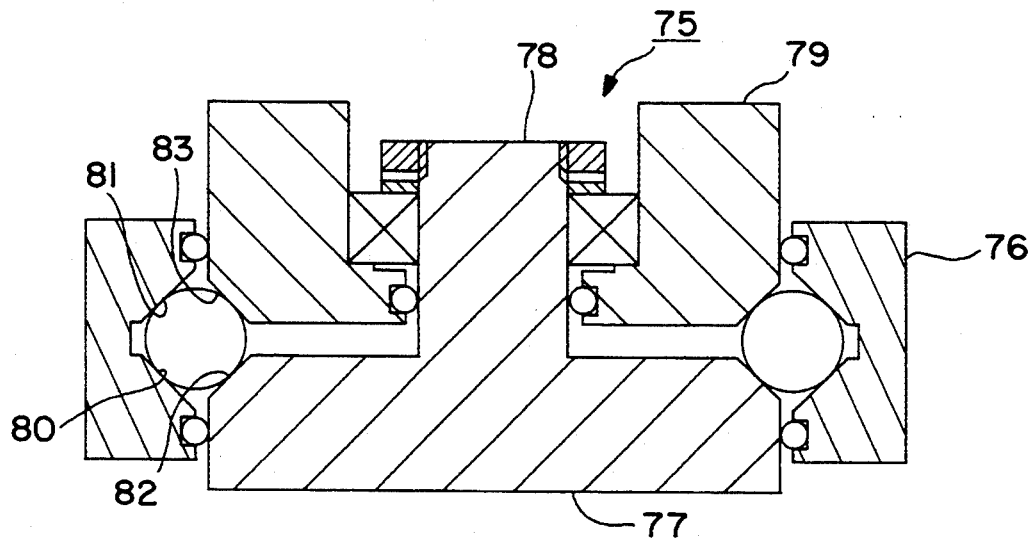
FIG. 7 is an axial cross-section of another embodiment of the apparatus adapted for power transmission.

If in-line transmission is desired, the embodiments of FIGS. 6 and 7 may be used instead. FIG. 6 also illustrates the fact that the drive ring can be internal as well as external.

Transmission 60 in FIG. 6 is symmetrical around a central axis 61. Shafts 62, 63 are provided for input and output of power. Both may be used for either purpose, depending on the ratio desired.

Shaft 62 is integral with an internal drive ring 64 which bears two track faces 65, 66.

Race 67 bears a track face 68. Race 69 is integral with shaft 63, and bears a track face 70. One of the races will be fixed ("grounded") to chassis (not shown). Then the other of the races will be rotatable relative to it. Either race may be "grounded".

Appropriate bearings are provided as illustrated.

FIG. 7 shows a variation of a transmission 75, in which drive ring 76 is external rather than internal, and it is not necessarily used to receive power. The term "drive ring" throughout this specification refers to the member which bears the two interconnected track faces.

In this embodiment, shaft 78 may receive power, which will be transmitted to shaft 79 (which may be tubular). Again any part can be grounded, with the other two used for input and output.

Track faces 80, 81, 82 and 83 are provided as in the other embodiments.

In the embodiments of FIGS. 6 and 7, the track faces which conform with those described in FIGS. 1-4, and function identically. Appropriate bearings are provided.

Suitable traction fluids as are present in existing traction drives are placed around the bearings to assure proper lubrication and traction. Appropriate seals are provided to retain the fluid.

Frusto-conical track faces have been specified as the purest form of point contact. Of course the track faces could be modified to have convex regions for the point of contact, or even recessed ring-like regions. In all of these situations, the relative velocities of the races and balls are of importance and are intended to be within the definitions of conical frustrums.

This invention is not to be limited by the embodiments shown in the drawings and described in the description which are given by way of example and not of limitation, but only in accordance with the scope of the accompanying claims.

I claim:

1. Apparatus in the nature of an adjustable mount or power transmission, said apparatus having a central axis, and comprising:
   a first race and a second race, each said race bearing a track face;
   a drive ring bearing a pair of track faces;
   a plurality of bearing balls trapped between said track faces making a point contact with all of said track faces simultaneously, said first and second races being separately rotatable, all of said track faces being surfaces of revolution at the said points of contact and at that those points being frusto-conical, each having a numerical angular value to the equator of the balls in motion, at least two of said values being equal, and at least one being different from those two;
   whereby when the drive ring is rotated, the polar axis of rotation of the balls is determined by the angular relationships between the track faces on the drive ring, the rate of rotation of the races relative to one another being determined by the angular difference between the unequal angle and one of the other angles.

2. Apparatus according to claim 1 in which one of said first and second races is fixed to a base and the other is fixed to a rotor.

3. Apparatus according to claim 2 in which said drive ring is external, its respective track faces facing inwardly and toward one another.

4. Apparatus according to claim 3 in which the said two equal angles are in the drive ring, the unequal angle being on one of the races.

5. Apparatus according to claim 1 in which said drive ring is mounted to a shaft, having its track faces facing outwardly, and in which one of the races is fixed to a shaft, said shafts being adapted for transmission of power.

6. Apparatus according to claim 5 in which the angles of the track faces on the drive ring are numerically equal.

7. Apparatus according to claim 1 in which said drive ring is external to said races, said races being adapted for transmission of power.

* * * * *